(12) United States Patent
Mizuno et al.

(10) Patent No.: US 11,154,068 B2
(45) Date of Patent: Oct. 26, 2021

(54) METHOD FOR PRODUCING VEGETABLE CHEESE-LIKE FOOD PRODUCT

(71) Applicant: FUJI OIL HOLDINGS INC., Osaka (JP)

(72) Inventors: Hiroshi Mizuno, Osaka (JP); Naoki Shirotani, Osaka (JP); Setsuo Tsujii, Osaka (JP)

(73) Assignee: FUJI OIL HOLDINGS INC., Osaka (JP)

( * ) Notice: Subject to any disclaimer, the term of this patent is extended or adjusted under 35 U.S.C. 154(b) by 236 days.

(21) Appl. No.: 16/495,102

(22) PCT Filed: Feb. 22, 2018

(86) PCT No.: PCT/JP2018/006340
§ 371 (c)(1),
(2) Date: Sep. 18, 2019

(87) PCT Pub. No.: WO2018/173610
PCT Pub. Date: Sep. 27, 2018

(65) Prior Publication Data
US 2020/0093150 A1    Mar. 26, 2020

(30) Foreign Application Priority Data

Mar. 21, 2017    (JP) .............................. JP2017-054457

(51) Int. Cl.
| | | |
|---|---|---|
| A23C 20/02 | (2021.01) | |
| A23J 3/16 | (2006.01) | |
| A23L 29/219 | (2016.01) | |
| A23C 20/00 | (2006.01) | |

(52) U.S. Cl.
CPC .............. *A23C 20/025* (2013.01); *A23J 3/16* (2013.01); *A23L 29/219* (2016.08); *A23C 20/00* (2013.01); *A23C 20/02* (2013.01)

(58) Field of Classification Search
CPC ....... A23C 20/00; A23C 20/02; A23C 20/025; A23L 29/219; A23J 3/16

USPC ......................................................... 426/634
See application file for complete search history.

(56) References Cited

U.S. PATENT DOCUMENTS

2010/0196575 A1*   8/2010   Sanchez ............... A23C 20/005
                                                                                   426/578

FOREIGN PATENT DOCUMENTS

| | | |
|---|---|---|
| JP | 2001000104 | 1/2001 |
| JP | 2009136158 | 6/2009 |
| JP | 2009172877 | 8/2009 |
| JP | 2012016348 | 1/2012 |
| JP | 2013013395 | 1/2013 |
| JP | 2014060935 | 4/2014 |
| JP | 2014233270 | 12/2014 |
| JP | 2016077211 | 5/2016 |
| WO | 2015056737 | 4/2015 |

OTHER PUBLICATIONS

"International Search Report (Form PCT/ISA/210)" of PCT/JP2018/006340, dated May 29, 2018, with English translation thereof, pp. 1-4.
"Search Report of Europe Counterpart Application", dated Dec. 21, 2020, p. 1-p. 7.

* cited by examiner

*Primary Examiner* — Jyoti Chawla
(74) *Attorney, Agent, or Firm* — JCIPRNET

(57) ABSTRACT

The present invention addresses the problem of providing a method for producing a vegetable cheese-like food product which exhibits suitability for a shaping process, such as shredding, and which has natural cheese-like meltiness (melting and oil-release when heated) and a milky flavor similar to that of natural cheese. This vegetable cheese-like food product is obtained by adjusting, through organic acid fermentation and/or lactic acid fermentation, the pH of an emulsified oil or fat composition to 3.5-5.7, said composition including a specific soybean protein, an acid-treated starch, and an oil or fat in which the solid fat content (SFC) account for at least 45% at 10° C. and at least 20% at 20° C.

12 Claims, No Drawings

METHOD FOR PRODUCING VEGETABLE CHEESE-LIKE FOOD PRODUCT

CROSS-REFERENCE TO RELATED APPLICATION

This application is a 371 application of the international PCT application serial no. PCT/JP2018/006340, filed on Feb. 22, 2018, which claims the priority benefits of Japan application no. 2017-054457, filed on Mar. 21, 2017. The entirety of each of the abovementioned patent applications is hereby incorporated by reference herein and made a part of this specification.

TECHNICAL FIELD

The present invention relates to a vegetable cheese-like food product and a method for producing a vegetable cheese-like food product which has natural cheese-like meltiness, shape retention, and a natural milky flavor.

BACKGROUND ART

Cheese is made mainly of milk collected from cows, water buffalos, sheep, goats, yaks, and the like, is one kind of dairy products produced through coagulation, fermentation, and the like, is used mostly in combination with other food products as well as being consumed as it is, and used in a variety of cuisines, for example, pizza, pasta, grain, risotto, cheese fondue, and the like, and thus the demand for cheese has been growing every year.

When cheese is used in combination with other food products, the cheese is mostly cooked by being heated, and thus it is preferable to have heat melting characteristics that enable cheese to be easily brought into a paste state by heating, stringy characteristics, and physical characteristics of a cheese texture remaining soft even when food products are kept cold.

However, examples of natural cheese used in pizza include, for example, mozzarella cheese, gouda cheese, and the like. While such natural cheese becomes like a sol when it is heated and exhibits strong stringy characteristics, it becomes waxy when cooled to a room temperature range (15 to 25° C.) and exhibits significantly deteriorated flavor and texture.

Furthermore, since cheese used for making pizza, gratin, and the like needs to be easily prepared for cooking and melt easily when it is heated and cooked, it is mostly available as molded cheese which can be cut into blocks or slices, and thus such cheese is required to have suitability for a shaping process such that it is able to be shredded.

Meanwhile, as the amount of animal food materials consumed rapidly increases, health problems resulting from this consumption habit such as obesity, diabetes, and the like have become serious issues, and thus interest in health improvement linked to eating habits has been continually increasing. In addition, the number of people who need to eat only vegetarian food or select to be vegetarian for different reasons is growing. Taking such circumstances into consideration, there has been increasing evaluation of vegetable protein food products.

In particular, proteins obtained from soybeans have gained attention as a substitute for animal proteins and as proteins of good quality that are digestible, include no cholesterol, and are well-balanced in terms of essential amino acids. Furthermore, soybean protein is particularly useful for people with an allergic reaction to milk, people who are not capable of digesting cholesterol or lactose, and people with diabetes. In addition, soybean protein is more digestible than animal proteins for those who suffer from stomach disorders.

For the above-described reasons, the demand for food made of soybeans as a main ingredient has soared and efforts have been made to incorporate soybeans into a wide range of food products.

For example, some studies have been performed with the purpose of replacing cheese and yogurt that are general dairy products, and thus soybean materials such as soymilk, soybean protein isolate, soybean powder, and the like have been used as raw materials containing soybean protein.

Patent Literature 1 relates to a method for producing a solid or creamy cheese-like food product obtained by fermenting soymilk using butyric acid bacteria, separating the generated curd into solids and liquids as it is or after heat sterilization, and dehydrating the solids such that they contain up to a predetermined level of moisture, for the purpose of providing a pure vegetable cheese-like food product containing no food additives, flavoring agents, and the like to people with an allergic reaction to dairy products, corpulent people, and people on a diet.

Patent Literature 2 relates to a method for producing a dairy product-like food product derived from soybean milk obtained by using *Natto* or *Bacillus natto*. A saccharine such as sugar, glucose, or fructose is added to soymilk, *Bacillus natto* or completed *Natto* are added thereto, and the soymilk is left for the time required for a reaction while stirring thereof is intermittently or continuously repeated and then is subjected to dehydration treatment (solid-liquid separation) at a stage when the coagulation of the soymilk is completed, and thereby a dairy product-like food product that is as hard as gouda cheese is obtained.

Patent Literature 3 discloses a soybean protein-containing cheese-like food product which has suitability for a shaping process, such as shredding, is easily melted by heating, and maintains a soft texture even after cooled. It is a soybean protein-containing cheese-like food product containing an acid-treated starch and an oil or fat having in which a solid fat content (SFC) accounts for at least 45% at 10° C. and at least 20% at 20° C. produced by using soybean protein of soymilk, soybean protein isolate, concentrated soybean protein, or soybean powder as a main ingredient.

REFERENCE LIST

Patent Literature

Patent Literature 1: Japanese Patent Application Publication Laid-Open (JP-A) No. 2009-172877
Patent Literature 2: Japanese Patent Application Publication Laid-Open (JP-A) No. 2001-000104
Patent Literature 3: Japanese Patent Application Publication Laid-Open (JP-A) No. 2014-233270

SUMMARY

Technical Problem

Although the food products described in Patent Literature 1 to 3 above have excellent shape retention and cheese-like texture as vegetable cheese, the food products described in Patent Literature 1 and 2 above do not have heat meltability and have little of the milky flavor of natural cheese. While the food product of Patent Literature 3 has heat meltability and suitability for a shaping process, such as shredding, it has poor meltiness (melting and oil-release when heated) and milky flavor unlike natural cheese.

Taking the above situation into consideration, the present invention aims to provide a method for producing a vegetable cheese-like food product which has natural cheese-like meltiness (melting and oil-release when heated) and a milky flavor similar to that of natural cheese that are difficult to realize with a cheese-like food product using a soybean protein material such as conventional soymilk, soybean protein isolate, and the like.

Solution to Problem

The inventors have intensively studied solutions to the above-described problems, and as a result, they found a solution to the problem by producing a vegetable cheese-like food product in which a pH of an emulsified oil or fat composition, which contains a soybean emulsified composition containing specific proteins and lipids, soybean protein derived from a specific soybean protein material having a reduced content of lipophilic proteins among soybean proteins, an acid-treated starch, and an oil or fat in which a solid fat content (SFC) accounts for at least 45% at 10° C. and at least 20% at 20° C., is adjusted to 3.5 to 5.7 through organic acid fermentation and/or lactic acid fermentation, and thereby the present invention has been completed.

That is, the present invention includes:

(1) A method for producing a vegetable cheese-like food product in which a pH of an emulsified oil or fat composition, which contains 0.6 to 1.4 wt. % of protein derived from a soybean emulsified composition A, 0.6 to 1.5 wt. % of protein derived from a soybean protein material B described below, an acid-treated starch, and an oil or fat in which a solid fat content (SFC) accounts for at least 45% at 10° C. and at least 20% at 20° C., is adjusted to pH 3.5 to 5.7 using an organic acid fermentation and/or lactic acid fermentation, the soybean emulsified composition A: a soybean emulsified composition having a protein content per dry matter of 25 wt. % or more, a lipid content (which refers to a content as a chloroform-methanol mixed solvent extract) of 100 wt. % or more with respect to the protein content, and an LCI value (a content of lipophilic proteins included in soybean protein) of 55% or more; and the soybean protein material B: a soybean protein material having a content of lipophilic proteins included in all proteins of 40% or less as an LCI value and a lipid content (which refers to a content as a chloroform-methanol mixed solvent extract) with respect to a protein content of less than 10 wt. %.

(2) The method for producing a vegetable cheese-like food product described in (1), in which a total amount of the protein derived from the soybean emulsified composition A and the protein derived from the soybean protein material B is 1 to 3 wt. %, and a content ratio between the protein derived from the soybean emulsified composition A and the protein derived from the soybean protein material B is 0.2 to 2.

(3) The method for producing a vegetable cheese-like food product described in (1) or (2), in which a rising melting point of an oil or fat is 20 to 50° C., and a content of the oil or fat is 10 to 50 wt. %.

(4) The method for producing a vegetable cheese-like food product described in (3), in which a hardness at 5° C. based on a rheometer measurement value is 500 g to 2000 g/19.6 mm$^2$ (measured with a circular plunger having a diameter of 5 mm at a table speed of 50 mm/minute).

(5) A method for continuously producing the vegetable cheese-like food product described in any one of (1) to (4), includes mixing a raw material containing the soybean proteins described in (1), an oil or fat, an acid-treated starch, and water, adjusting a pH to pH 3.5 to 5.7 using an organic acid fermentation and/or lactic acid fermentation, and then homogenizing; after the homogenizing, performing a heat treatment using at least one device selected from a tube heat exchanger, a high speed shear cooker, and a direct steam blow type sterilizer, and cooling.

Advantageous Effects of Invention

According to the present invention, it is possible to provide a method for producing a vegetable cheese-like food product which has suitability for a shaping process, such as shredding, natural cheese-like meltiness (melting and oil-release when heated), and a milky flavor similar to that of natural cheese.

DESCRIPTION OF EMBODIMENTS

A vegetable cheese-like food product of the present invention contains a soybean emulsified composition containing a specific protein and lipid and soybean protein derived from a specific soybean protein material having a reduced content of lipophilic proteins among soybean proteins and contains an acid-treated starch and an oil or fat in which the solid fat content (SFC) accounts for at least 45% at 10° C. and at least 20% at 20° C. The present invention will be described below in detail.

The present invention is a method for producing a vegetable cheese-like food product by using a soybean emulsified composition A and a soybean protein material B together, containing 0.6 to 1.4 wt. % of protein derived from the soybean emulsified composition A and 0.6 to 1.5 wt. % of protein derived from the soybean protein material B, and an acid-treated starch and an oil or fat in which the solid fat content (SFC) accounts for at least 45% at 10° C. and at least 20% at 20° C.

By using the soybean emulsified composition A and the soybean protein material B together, mixing and homogenizing an oil or fact having this SFC, the acid-treated starch, and water, then performing heat treatment on the mixture using a tube heat exchanger or a direct steam blowing sterilizer, and then cooling the mixture, a vegetable cheese-like food product which has natural cheese-like meltiness (melting and oil-release when heated) and a milky flavor similar to that of natural cheese in comparison to a vegetable cheese-like food product made of conventional soybean milk, whole fat soymilk, soybean powder, concentrated soybean protein, or soybean protein isolate as a protein raw material can be produced.

(Soybean Emulsified Composition A)

The soybean emulsified composition A used in the present invention is a material having a protein content per dry matter of 25 wt. % or more and a lipid content of 100 wt. % with respect to the protein content among materials in which soybean protein is emulsified with a lipid such as soymilk.

Further, it is particularly preferable to obtain a material from soybeans that has been denaturated in advance until a nitrogen solubility index (NSI) thereof enters a specific range. The soybean emulsified composition obtained from such a raw material is an emulsified composition having a particularly high content of lipophilic proteins (or lipoxygenase proteins as another indicator) other than glycinin or β-conglycinin among contained soybean proteins, and thus containing many neutral lipids and polar lipids. That is, the composition has a protein content per dry matter of 25 wt. % or more and a lipid content of 100 wt. % or more with respect to the protein content and has a lipophilic proteins content index (LCI) value of 55% or more and more preferably 60% or more. Here, an LCI value is an index for estimating a content of lipophilic proteins contained in a protein. Details of a composition of proteins and lipids in a soybean emulsified composition incorporate the description of Japanese Patent Application Publication Laid-Open No. 2013-143931.

(Protein of Soybean Emulsified Composition A)

The protein content of the soybean emulsified composition A used in the present invention is 25 wt. % or more or preferably 30 wt. % or more per dry matter. In addition, although an upper limit of the protein content is not limited, it is preferably 50 wt. % or less, and more preferably 40 wt. % or less.

A protein content is measured as a nitrogen content using the Kjeldahl method in the present invention and obtained by multiplying the nitrogen content by 6.25 as a nitrogen conversion factor.

(Lipids of Soybean Emulsified Composition A)

A lipid content of the soybean emulsified composition A used in the present invention is 100 wt. % or more, preferably 120 to 300 wt. %, and more preferably 120 to 200 wt. % with respect to the protein content, and thus a content of lipid is greater than that of protein.

A lipid content is generally measured using an ether extraction method, but since the soybean emulsified composition contains a large amount of polar lipids that are difficult to extract using an ether in addition to neutral lipids, a lipid content in the present invention is a value calculated using an amount of extract extracted from a mixed solvent having a ratio of chloroform to methanol of 2:1 (volume ratio) over 30 minutes at a boiling point under normal pressure as a total lipid amount. For a solvent extraction device, a "Soxtec" manufactured by FOSS Ltd. can be used.

(Dry Matter Content of Soybean Emulsified Composition A)

The soybean emulsified composition A used in the present invention normally has a fresh cream-like property and has about 15 to 30 wt. % of normal dry matter, but a content thereof is not particularly limited. That is, the composition may be a liquid having a low viscosity by adding water thereto, may be cream and having a higher viscosity after being processed such that it is concentrated, or may be powdery after being processed into a powder.

(Manner of Production of Soybean Emulsified Composition A)

The specific soymilk composition used in the present invention can be obtained by, for example, preparing a suspension or soymilk by adding water to whole fat soybeans, then fractionating by a centrifuge, and then separating the upper portion thereof having a lower specific gravity.

In addition, soybeans having specific properties may be used as a raw material to efficiently obtain a soybean emulsified composition having an LCI value of 55% or more. A soybean emulsified composition can be obtained by, for example, preparing a suspension by adding water to fat-containing soybeans such as whole fat soybeans having a nitrogen solubility index of 20 to 77, containing a specific water-soluble protein, and having a lipid content of 15 wt. % or more, then separating the suspension into solids and liquids, causing neutral and polar lipids to transition to insoluble fractions, removing the soluble fractions containing proteins and sugar, and then recovering insoluble fractions. Details of the manner of production incorporate the description of Japanese Unexamined Patent Application Publication No. 2013-143931.

(Soybean Protein Material B)

The specific soybean protein material B used as a raw material in the present invention includes proteins mainly composed of glycinin and β-conglycinin extracted from soybeans as a main component and has a low content of lipophilic proteins in the all proteins.

That is, it is a soybean protein material having a content of lipophilic proteins in the all proteins of 40% or less as an LCI value.

(Form of Product of Soybean Protein Material B)

A form of product of the soybean protein material B is not particularly limited as long as the product satisfies the above-described requirements, and although soymilk is a specific example thereof, a form of a product produced by using soymilk as a raw material with an increased protein purity may be exemplified as a form of product other than soymilk, and, the form of soybean protein isolate with an increased protein purity due to removing water soluble components such as sugar or minerals from soybeans, and a form of fractionated soybean proteins with an increased purity of glycinin or β-conglycinin due to further fractionating the proteins of the soymilk or soybean protein isolate may be typically exemplified.

(Protein of Soybean Protein Material B)

A protein content of the soybean protein material B is preferably in a range of 30 to 99 wt. % per dry matter. In a case in which a soybean protein material is in the form of soymilk, a lower limit of protein content can normally be 45 wt. % or more, 50 wt. % or more, or 55 wt. % or more, and an upper limit thereof can be 70 wt. % or less, or 65 wt. % or less per dry matter. A value thereof can also be in a range of 30 wt. % or more and less than 45 wt. % depending on a processing method such as fractionation of the proteins, addition of other components, or the like. In addition, in a case in which a soybean protein material is in the form of soybean protein isolate obtained by further refining soymilk and increasing the protein purity, a lower limit thereof can exceed 70 wt. % or can be 80 wt. % or more, and an upper value can be 99 wt. % or less, or 95 wt. % or less. Further, a protein content is measured as a nitrogen content using the Kjeldahl method in the present invention and obtained by multiplying the nitrogen content by 6.25 as a nitrogen conversion factor.

Lipophilic proteins refers to the group of minor acid-precipitable soybean proteins other than glycinin (7S globulin) and β-conglycinin (11S globulin) among the main acid-precipitable soybean proteins of soybeans, and correspond to many polar lipids such as lecithin, glycolipids, and the like. Lipophilic proteins may be abbreviated simply as "LP" below.

Since LP is mixed with miscellaneous proteins, it is difficult to identify every protein and exactly measure contents of LP, but the values thereof can be estimated by obtaining the following lipophilic protein content index (LCI; a content of lipophilic protein contained in soybean protein).

According to the definition, the LCI value of the protein included in the soybean protein material B is normally 40% or less, more preferably 38% or less, and more preferably 36% or less.

When a general soybean protein material is manufactured using normal non-denatured soybean (having an NSI value of 90 or higher) as a raw material, LP is in a soluble state, and thus it is extracted into a water soluble fraction when water is extracted from the material. On the other hand, since the soybean protein material B is produced by causing LP to be denatured and to become insoluble through heat treatment in raw soybeans, LP is difficult to extract and remains in the insoluble fraction.

As described above, a soybean protein material in which a content of lipids is maintained at the lowest level can be obtained by reducing a content of LP contained in proteins.

Compositional Analysis of Each Component of Protein

A composition for respective components of proteins of the soybean protein material B can be obtained by analysis using SDS polyacrylamide gel electrophoresis (SDS-PAGE).

Hydrophobic interactions between protein molecules, and hydrogen bonds and disulfide bonds between the molecules are broken due to the action of SDS which is a surfactant and mercaptoethanol which is a reducing agent, and negatively charged protein molecules show an electrophoretic distance according to specific molecular weights, and thereby proteins exhibit characteristic electrophoretic patterns. After staining the SDS gel with Coomassie brilliant blue (CBB), which is a dye, after the electrophoresis, the ratio of the density of bands corresponding to various protein molecules to the density of bands of all proteins can be obtained using a densitometer in a calculation method.

Method for Estimating LP Content and Measuring LCI Value (a) α Subunit and α' subunit (α+α') for 7S, acid subunit (AS) for 11S, and a 34 kDa protein and lipoxygenase protein (P34+Lx) for LP are selected as main protein components of each protein, and a staining ratio of each of the selected proteins is obtained using SDS-PAGE. Electrophoresis can be performed under the conditions of Table 1.

(b) X (%)=(P34+Lx)/{(P34+Lx)+(α+α')+AS}×100(%) is obtained.

(c) Since an LP content of soybean protein isolate prepared from low denatured defatted soybean is about 38%, a correction coefficient k*=6 is multiplied by (P34+Lx) to get X=38(%).

(d) That is, an estimated LP content (Lipophilic Proteins Content Index, which will be abbreviated as "LCI") is calculated using the following formula.

TABLE 1

Application amount: 10 μl of sample solution with 0.1% of protein to each well
Width of well: 5 mm
Volume of well: 30 μl
Staining solution: 1 g of Coomassie brilliant blue (CBB), 500 ml of methanol, and 70 ml of glacial acetic acid (after CBB is completely dissolved in methanol, an acetic acid and water are added thereto to to make up to 1 L.)
Staining time: 15 hours
Decoloring time: 6 hours
Densitometer: GS-710 Calibrated Imaging Densitometer/Quantity One SoftwareVer. 4.2.3 (Bio Rad Japan Co., Ltd.)
(scanning width: 5.3 mm, sensitivity: 30)

$$LCI(\%) = \frac{k^* \times (P34 + Lx)}{k^* \times (P34 + Lx) + (\alpha + \alpha') + AS} \times 100$$

k*: Correction coefficient (which is 6)
P34: 34 kDa Protein, a main component of LP
Lx: Lipoxygenase, a main component of LP
α: α Subunit, a main component of 7S
α': α' Subunit, a main component of 7S
AS: Acid subunit, a main component of 11S The soybean protein material B can include sugars and proteins as main components accounting for the most of dry matter, and a content of carbohydrates (dry matter free from lipids, proteins, and minerals) in that case is preferably 80 wt. % or more and more preferably 85 wt. % or more per dry matter in terms of the total content including protein. The rest of the dry matter is mostly composed of minerals and traces of lipids, and a content of minerals is normally 15 wt. % or less and preferably 10 wt. % or less per dry matter. While dietary fiber is contained in carbohydrates, the soybean protein material A is free from dietary fiber since it removed therefrom, and thus a content of dietary fiber is very small such as 3 wt. % or less, and preferably 2 wt. % or less per dry matter.

(Lipid of Soybean Protein Material B)

The soybean protein material B only includes lipids at a lower proportion than the ratio of lipid content/protein content of soybean powder which is a raw material, and a content of polar lipids is preferably low as well as neutral lipids. On the other hand, defatted soymilk or the like can be generally obtained by defatting soybeans using hexane and extracting water from the obtained defatted soybeans, and the defatted soymilk includes a large amount of polar lipids without removal.

For this reason, a content of lipids in the soybean protein material B is set to a value obtained by freeze-drying a sample, and then setting an amount of extract extracted from the sample in a solvent in which chloroform and methanol are mixed at a ratio of 2:1 (volume ratio) for 30 minutes at a boiling point under normal pressure as a total amount of lipids. For a solvent extraction device, "Soxtec" manufactured by FOSS Ltd. can be used. Further, the above-described measurement method will be referred to as "chloroform-methanol mixed solvent extraction method."

A lipid content with respect to the protein content in the soybean protein material B is preferably less than 10 wt. %, more preferably less than 9 wt. %, more preferably less than 8 wt. %, more preferably less than 5 wt. %, and more preferably 4 wt. % or less, and can be 3 wt. % or less. That is, a soybean protein material including a very small amount of all lipids including neutral lipids and polar lipids is one preferable form in comparison to proteins. By applying the soybean protein material with less LP and a smaller amount of all lipids to lactic acid fermentation, it is possible to obtain a fresh flavored lactic acid fermented material that is very difficult to feel the disagreeable soy odor. As such a material, there is, for example, a "fat-reduced soybean protein material" disclosed in Japanese Unexamined Patent Application Publication No. 2012-16348. Although defatted soymilk extracted from soybeans defatted using an ordinary organic solvent is also almost free from neutral lipids, some polar lipids are extracted therefrom, thus a lipid content with respect to a protein content is about 5 to 6 wt. %. In that case, a lipid content per dry matter is preferably 5 wt. % or less, preferably 3 wt. % or less, more preferably 2 wt. % or less, and even more preferably 1.5 wt. % or less.

(Dry Matter Content of Soybean Protein Material B)

When the soybean protein material B is a liquid such as in the form of soymilk, there is generally about 3 to 20 wt. % of dry matter therein, but the form of the soybean protein material is not particularly limited. That is, it may be a material in a liquid state having low viscosity due to addition of water, a material having high viscosity due to concentration processing such as vacuum concentration, freeze concentration, or the like, or a material in a powdery state due to powder processing such as spray drying, freeze drying, or the like.

When a vegetable cheese-like food product is prepared using the soybean emulsified composition A and the soybean protein material B in the present invention, a content of protein derived from the soybean emulsified composition A is 0.6 to 1.4 wt. %, more preferably 0.7 to 1.2 wt. %, and most preferably 0.7 to 1.0 wt. %. When the content is less than the lower limit, the material tends to have deteriorated meltiness and little milky flavor. On the contrary, when the content exceeds the upper limit, the material tends to have a little too strong flavor of soymilk but tends to have deteriorated shredding suitability caused by reduced hardness. In addition, a content of protein derived from the soybean protein material B is 0.6 to 1.5 wt. %, and more preferably 0.9 to 1.5 wt. %. When the content is less than the lower limit, the material tends to have a little too strong flavor of soymilk but tends to have deteriorated shredding suitability caused by reduced hardness. On the contrary, when the content exceeds the upper limit, the material tends to have deteriorated meltiness, little flavor of soymilk, and a reduced milky flavor.

In the present invention, a total amount of protein derived from the soybean emulsified composition A and a protein derived from the soybean protein material B is preferably 1 to 3 wt. %, and more preferably 1.5 to 2.5 wt. %. When the total amount is less than 1 wt. %, the flavor of soymilk becomes low, the dairy flavor become poor, and the shredding suitability caused by reduced hardness deteriorates. Conversely, when the total amount exceeds 3 wt. %, the material tends to have a little too strong flavor of soymilk but tends to have little milky flavor.

A content ratio between the protein derived from the soybean emulsified composition A and the protein derived from the soybean protein material B is preferably 0.2 to 2 and more preferably 0.3 to 1.5. When the content ratio is lower than 0.2, the material tends to have little flavor of soymilk and a poor milky flavor. Conversely, when the content ratio exceeds the upper limit, the material tends to have a little too strong flavor of soymilk and also a poor milky flavor after all.

Although the vegetable cheese-like food product is prepared using the soybean emulsified composition A and the soybean protein material B together in the present invention, a manner of preparation may be as follows.

When a fresh creamy soybean emulsified composition (having a content of dry matter of 15 to 30 wt. %, a content of protein included in the dry matter of 25 to 50 wt. %, and a content of lipids included in the dry matter of 40 to 75 wt. %) disclosed in, for example, Japanese Unexamined Patent Application Publication No. 2013-143931 is used as the soybean emulsified composition A, and a fat-reduced soybean protein material (having a content of dry matter of 3 to 20 wt. %, a content of protein included in the dry matter of 45 to 70 wt. %, and a content of lipids included in the dry matter of 10 wt. % or less) disclosed in, for example, Japanese Unexamined Patent Application Publication No. 2012-16348 is used as the soybean protein material B, a target vegetable cheese-like food product can be obtained by mixing 10 to 24 parts by weight of the soybean emulsified composition A with 13 to 27 parts by weight of the soybean protein material B, and preferably mixing the soybean emulsified composition A with the soybean protein material B to make a total amount thereof 30 to 50 parts by weight.

In another manner of preparing a vegetable cheese-like food product in the present invention, a concentrate or dry powder thereof can be used as the soybean emulsified composition A instead of the above-described fresh creamy soybean emulsified composition. In addition, a concentrate or dry powder thereof can be used as the soybean protein material B instead of the above-described fat-reduced soybean protein material. When a concentrate or dry powder is used, an emulsified oil composition can be prepared by dispersing and dissolving the concentrate or dry powder in an appropriate amount of water to adjust a content of proteins derived from the soybean emulsified composition A and the soybean protein material B.

(Acid-Treated Starch)

It is important for the vegetable cheese-like food product of the present invention to contain an acid-treated starch. An acid-treated starch is a processed starch obtained by processing an unprocessed starch with hydrochloric acid, sulfuric acid, or the like, and an acid-treated starch derived from peas, potatoes, tapioca, rice, waxy corn, corn, or the like can be used. Among these, an acid-treated starch derived from peas or potatoes is preferably used in terms of materials having processing suitability of a cheese-like food product containing soybean proteins. In addition, an acid-treated starch derived from peas is most preferably used in terms of viscosity during formation when preparing the cheese-like food product containing soybean proteins.

In the present invention, the vegetable cheese-like food product contains 3 to 25 wt. % of the acid-treated starch, preferably 5 to 20 wt. %, and more preferably 10 to 20 wt. %.

(Oil or Fat)

SFC

It is important for the vegetable cheese-like food product of the present invention to contain an oil or fat in which the solid fat content (SFC) accounts for at least 45% at 10° C. and at least 20% at 20° C. In terms of processing suitability of the cheese-like food product, the SFC at 10° C. is more preferably at least 50% and even more preferably at least 55%. In addition, the SFC at 20° C. is more preferably at least 25% and even more preferably at least 30%. As an oil or fat, oils that can be used for food and have a melting point of about 20 to 50° C. can be widely adopted, and examples thereof include vegetable oils, for example, rapeseed oil, soybean oil, sunflower oil, cottonseed oil, peanut oil, rice bran oil, corn oil, safflower oil, olive oil, kapok oil, sesame oil, evening primrose oil, palm oil, shea butter, monkey butter, cocoa butter, coconut oil, palm kernel oil, and the like, and animal fats and oils such as milk fat, beef tallow, pork fat, fish oil, or whale oil, and a single oil, a mixed oil, or a processed oil or fat obtained from curing, fractionating, esterifying, or the like can also be exemplified.

Triglyceride Composition

Furthermore, a P2O-type triglyceride (in which P indicates palmitic acid, and O indicates oleic acid) is contained at a proportion of at least 8% and more preferably at least 10% among oils or fats having an SFC in the above-described range in terms of suitability for a shaping process of a cheese-like food product containing soybean protein.

The P2O-type triglyceride does not limit a regioisomer of fatty acids contained in triglyceride molecules, and means both 1,3-palmitoyl, 2-oleyl glycerin and 1,2-palmitoyl, 3-oleyl glycerin. Although the melting point part of palm oil obtained by separating palm olein which is obtained by further separating palm oil is preferably used for the P2O-type triglyceride, the P2O-type triglyceride can be obtained by curing the above-described materials or by performing transesterification on an oil or fat containing oleic acid and palmitic acid.

Rising Melting Point

The vegetable cheese-like food product of the present invention preferably uses an oil or fat having a rising melting point in a range of 20 to 50° C., preferably 25 to 45° C., and more preferably 30 to 40° C. in terms of a flavor and the feeling of melting in the mouth.

Content of an Oil or Fat

The vegetable cheese-like food product of the present invention contains 10 to 50 wt. %, preferably 15 to 45 wt. %, and more preferably 20 to 40 wt. % of fats and oils, and it is thought that, since the oil or fat forms a better crystalline network with the above-described content of the oil or fat and the aging of the acid-treated starch progresses, suitability for a shaping process of the vegetable cheese-like food product is obtained.

The vegetable cheese-like food product of the present invention can contain milk fat derived from butter, fresh cream, or the like as an oil or fat other than vegetable oil or fat, which can improve the flavor of the vegetable cheese-like food product. In addition, natural cheese and/or processed cheese can be incorporated into the vegetable cheese-like food product, and by incorporating a small amount of natural cheese and/or processed cheese, the flavor of the vegetable cheese-like food product can be further improved.

However, when a pure vegetable cheese-like food product is prepared, a content of an oil or fat or natural cheese and/or processed cheese derived from animals needs to be 0 wt. %.

Thickener

If the vegetable cheese-like food product of the present invention also contains a thickener, this is preferable, since a higher viscosity can be imparted to the vegetable cheese-like food product and suitability for a shaping process such as shredding is further improved. As a thickener, a processed starch such as hydroxypropylated starch, locust bean gum, or guar gum can be suitably used.

Emulsifier

The vegetable cheese-like food product of the present invention can utilize an emulsifier that will not harm the flavor. An emulsifier is not particularly limited, a conventionally known emulsifier can be used, and examples thereof include lecithin, sucrose fatty acid esters, propylene glycol fatty acid esters, sorbitan fatty acid esters, glycerin fatty acid esters, polyglycerin fatty acid esters, various organic acid monoglycerides such as acetic acid monoglyceride, tartaric acid monoglyceride, acetic acid-tartaric acid mixed monoglycerides, citric acid monoglyceride, diacetyl tartaric acid monoglyceride, and lactic acid monoglyceride, and polyoxyethylene sorbitan fatty acid esters.

In addition to the above-described emulsifier, a pH adjuster such as phosphate can also be used as a known additive. Furthermore, the vegetable cheese-like food product of the present invention can utilize a flavor such as a milky flavor, cheese flavor, soymilk flavor, any of various spices, or fruit puree and jam for the purpose of imparting a flavor, a sweetener such as sucralose, aspartame, or *Stevia* for the purpose of imparting sweetness, and a coloring agent such as beta-carotene, a paprika pigment, or an anato dye for the purpose of coloring. In addition, a shelf life improver such as glycine, sodium acetate, or egg white lysozyme can be used for the purpose of improving a shelf life.

(Physical Property of Vegetable Cheese-Like Food Product)

The vegetable cheese-like food product of the present invention has the above-described composition, and has, as physical properties, a hardness of preferably 500 g to 2000 g/19.6 mm$^2$ and more preferably e 700 g to 1800 g based on a rheometer measurement value at 5° C. which is appropriate for shredding process.

Further, the hardness of the vegetable cheese-like food product of the present invention using a rheometer was measured by using a sample with a rheometer "RT-2002J" manufactured by Rheotech Corporation and a circular plunger having a diameter of 5 mm at a table speed of 50 mm/minute. A product that had been stored for 7 days at 5° C. after the production was used as the sample.

(Molded Cheese-Like Food Product)

Since the vegetable cheese-like food product of the present invention has the above-described physical property, it has excellent suitability for a shaping process and thus can be cut into a suitable shape such as slices, dice pips, stripes, or shreds, and thereby a molded cheese-like food product containing soybean protein can be provided.

(Meltiness)

The vegetable cheese-like food product of the present invention has natural cheese-like meltiness when heated, it becomes paste when heated at 200° C. for 5 minutes, and thereby a vegetable cheese-like food product having natural cheese-like meltiness and exhibiting a good heat melting property and an appropriate oil-releasing property can be provided. Evaluation of meltiness can be made, specifically, in the following method in the present invention.

The vegetable cheese-like food product is cut to prepare a shredded vegetable cheese-like food product having a size of about 30×5×3 mm, filter paper is placed in a heat resistant metal container having an inner diameter of 85 mm and a thickness of 30 mm, then 10 g of the food product is placed thereon, 1 g of water is added onto the filter paper, the food product is heated in an oven at 200° C. for 5 minutes, and then meltiness (heat melting property, presence of oil-release, and presence of burn) is evaluated.

(Spreadability in Cooled State after Melting)

After the vegetable cheese-like food product of the present invention is melted by heat, it has spreadability and maintains soft texture even after cooled again. The spreadability can be evaluated, specifically, using the following method in the present invention.

A vegetable cheese-like food product is cut to prepare a shredded vegetable cheese-like food product having a size of about 30×5×3 mm, 10 g thereof is placed on aluminum foil, the food product is heated in an oven at 200° C. for 5 minutes to be heated and melt, and then is cooled to 20° C., and whether the food product can be widely spread on the aluminum foil when it is spread sidewards with a spatula is evaluated.

"Soft texture" in the present invention refers to a soft property in comparison to the hardness when the food product is heated and melted, however, specifically when the food product still has spreadability even after it is heated, melted, and cooled as described above, whether it keeps soft texture can be evaluated.

When spreadability is expressed with a specific number, the food product is cooled to 20° C. after heated and melted, and shows a physical property as a hardness based on a rheometer measurement value (having a circular plunger having a diameter of 3 cm at a table speed of 50 mm/minute) of less than 100 g/19.6 mm$^2$, and more preferably 50 g/19.6 mm$^2$ or less.

(Production Method)

As a method for producing a vegetable cheese-like food product of the present invention, for example, an oil-in-water emulsion in which the soybean emulsified composition A, the soybean protein material B, an oil or fat, an acid-treated starch, a salt, a pH adjuster, a dye, and water are mixed is pre-emulsified, the emulsion is adjusted to have a pH 3.5 to 5.7 through organic acid fermentation and/or lactic acid fermentation and is homogenized, then sterilization and cooling processes are performed thereon, and thereby a vegetable cheese-like food product can be produced.

Although it is preferable to adjust the pH to 3.5 to 5.7 using an organic acid or an alkaline salt, it is possible to adjust the pH in the range by causing the oil-in-water emulsion to go through lactic acid fermentation. When lactic acid fermentation is performed, a lactic acid bacteria starter can be used until the pH reaches 3.5 to 5.7 or preferably 4 to 5.5 at 15 to 45° C.

The shelf life tends to be short when the pH exceeds 5.7, and a sour taste becomes strong when the pH is lower than 3.5, and thus the vegetable cheese-like food product has bad balance as a food product as a whole when it is used as a vegetable cheese-like food product, and thus the pH needs to be adjusted in the above-described range. Heat sterilization is performed also to gelatinize the starch, and preferably performed at a temperature of 70 to 95° C.

In the above-described production method, any of a batch method and a continuous method can be employed. However, since the vegetable cheese-like food product of the present invention contains the acid-treated starch, it can be continuously produced by continuously performing heat treatment using at least one device selected from a tube heat exchanger, a high speed shear cooker used for producing processed cheese, a direct steam blow type sterilizer, rather than patch production in the heat treatment process, different from cheese mainly composed of protein gel such as conventional natural cheese or processed cheese. Examples of a heat exchanger that continuously performs heat treatment include a scraping-type continuous heat exchanger, and the like.

EXAMPLES

The present invention will be described in more detail using the following examples. Further, both parts and % in the examples are based on weights.

Flavor evaluation of each of examples was performed based on the average values presented by 5 panelists in terms of the following criteria.

(Flavor Evaluation Criteria)

(Soy milk flavor): ◉ indicates good and refreshing soymilk flavor.
  ○ indicates slightly weak but refreshing soymilk flavor.
  Δ indicates too weak or slightly strong soymilk flavor.
  × indicates no soymilk flavor or two strong soymilk flavor.

(Dairy flavor): ◉ indicates very good, ○ indicates good, Δ indicates slightly weak, and × indicates no dairy flavor.
(Rich taste): ◉ indicates very good, ○ indicates good, Δ indicates slightly weak, and × indicates no rich taste.

Example 1

12 parts of the soybean emulsion A ("Ko-cream" manufactured by Fuji Oil Co., Ltd.: a content of dry matter of 19.8%, a content of protein per dry matter of 28.3%, lipids per dry matter of 62.1%, and an LCI value of 67%), 25 parts of the soybean protein material B ("Bimi-Tonyu" manufactured by Fuji Oil Co., Ltd.: a content of dry matter of 10.0%, a content of protein per dry matter of 54.0%, lipids per dry matter of 5%, and an LCI value of 34%), 25 parts of palm mid fraction (an SFC of 90% at 10° C., 80% at 20° C., a content of P2O triglyceride of 65%, and a rising melting point of 30° C.), 18 parts of an acid-treated starch derived from peas, 1.2 parts of salt, 12 parts of water, 3 parts of processed starch derived from tapioca, 0.2 parts of yeast extract, 3 parts of powdered cellulose, 1.1 parts of pH adjuster containing lactic acid, and 0.001 parts of dye were mixed at 55° C. for 10 minutes, and further homogenized under a pressure of 100 kg/cm$^2$.

After the homogenization, the mixture was caused to pass through a scraping-type continuous heat exchanger, was subjected to heat sterilization at a temperature of 80 to 90° C., filling, and being cooled using a tunnel freezer, and then was caused to age in a refrigerator, and thereby a vegetable cheese-like food product was obtained.

The qualities of the cheese-like food product including the physical properties (hardness, heat melting property, and spreadability after heat melting) and the flavor were evaluated.

The content of the oil or fat of the cheese-like food product was 30%, the content of proteins thereof was 2.1% (a protein derived from the soybean emulsion A of 0.7%, a protein derived from the soybean protein material B of 1.4%), the pH thereof was 5.4, and the hardness thereof at 5° C. based on a rheometer measurement value was 600 g/19.6 mm$^2$ (measured with a circular plunger having a diameter of 5 mm at a table speed of 50 mm/minute manufactured by Rheotech Corporation).

Comparative Example 1

A vegetable cheese-like food product was prepared in the same manner as in Example 1 by changing 12 parts of the soybean emulsion A and 25 parts of the soybean protein material B of Example 1 to 37 parts of the soybean emulsion A. The content of the oil or fat of the cheese-like food product was 30%, the content of protein thereof was 2.1% (a protein derived from the soybean emulsion A of 2.1%), the pH thereof was 5.4, and the hardness thereof at 5° C. based on a rheometer measurement value was 350 g/19.6 mm$^2$ (measured with a circular plunger having a diameter of 5 mm at a table speed of 50 min/minute manufactured by Rheotech Corporation).

Comparative Example 2

A vegetable cheese-like food product was prepared in the same manner as in Example 1 by changing 12 parts of the soybean emulsion A, 25 parts of the soybean protein material B, and 11 parts of water of Example 1 to 39 parts of the soybean protein material B and 9 parts of water. The content of the oil or fat of the cheese-like food product was 30%, the content of protein thereof was 2.1% (a protein derived from the soybean protein material B of 2.1%), the pH thereof was 5.4, and the hardness thereof at 5° C. based on a rheometer measurement value was 700 g/19.6 mm$^2$ (measured with a circular plunger having a diameter of 5 mm at a table speed of 50 mm/minute manufactured by Rheotech Corporation). The food product had suitability for a shaping process such as shredding. Although the food product was melted by heat when it was heated at 200° C. for 5 minutes, it did not exhibit oil-release like natural cheese and the occurrence of slight burn was recognized. The food product had a slight soybean flavor, was watery, and had a poor milky flavor.

Comparative Example 3

A vegetable cheese-like food product was prepared in the same manner as in Example 1 by changing 12 parts of the soybean emulsion A, 25 parts of the soybean protein material B, and 11 parts of water of Examples 1 to 40 parts of commercially available non-adjusted soymilk (with a total content of solids of 9.2%, a content of proteins of 4.9%, and a content of lipids of 3.7%) and 8 parts of water. The content of the oil or fat of the cheese-like food product was 30%, the content of protein thereof was 2.1% (a protein derived from the non-adjusted soymilk of 2.1%), the pH thereof was 5.4, and the hardness thereof at 5° C. based on a rheometer measurement value was 650 g/19.6 mm² (measured with a circular plunger having a diameter of 5 mm at a table speed of 50 mm/minute manufactured by Rheotech Corporation).

Table 2 shows the evaluation results of Example 1 and Comparative examples 1 to 3.

TABLE 2

|  | Example 1 | Comparative example 1 | Comparative example 2 | Comparative example 3 |
|---|---|---|---|---|
| Soybean emulsion A* | 12 | 37 | — | — |
| Soybean protein material B** | 25 | — | 39 | — |
| Non-adjusted soymilk | — | — | — | 40 |
| Protein derived from A* | 0.7 | 2.1 | — | — |
| Protein derived from B** | 1.4 | — | 2.1 | — |
| Content of proteins | 2.1 | 2.1 | 2.1 | 2.1 |
| Shredding property | Yes | No | Yes | Yes |
| Meltiness/ Heat melting | Yes | Yes | Yes | Yes |
| Oil release | Yes | Yes | No | No |
| Burn | No | No | Yes | Yes |
| Spreadability after heat melting | Yes | Yes | Yes | Yes |
| Soy milk flavor | ○ | △ | △ | △ |
| Milky flavor | ◎ | △ | △ | △ |
| Rich taste | ◎ | ○ | △ | △ |

Soybean emulsion A*: Ko-cream
Soybean protein material B**: Bimi-Tonyu

As shown in Table 2, Example 1 in which 12 parts of the soybean emulsion A and 25 parts of the soybean protein material B were used together exhibited suitability for a shaping process such as shredding and a heat melting property and natural cheese-like oil-release when it was heated at 200° C. for 5 minutes, and had a moderate soymilk flavor and milky flavor. Comparative example 1 in which 37 parts of the soybean emulsion A was used exhibited little slight suitability for a shaping process such as shredding and the heat melting property and natural cheese-like oil-release when it was heated at 200° C. for 5 minutes, but had a little strong soymilk flavor and a poor milky flavor. Conversely, Comparative example 2 in which 39 parts of the soybean protein material B was used exhibited suitability for a shaping process such as shredding and the heat melting property when heated at 200° C. for 5 minutes, but natural cheese-like oil-release was not found and the occurrence of slight burn was recognized. The food product had a slight soymilk flavor, was watery, and had a poor milky flavor. Comparative example 3 in which 40 parts of non-adjusted soymilk exhibited substantially the same result as that of Comparative example 2.

Example 2

A vegetable cheese-like food product was obtained in the similar manner as in Example 1 by replacing 12 parts of the soybean emulsion A and 25 parts of the soybean protein material B of Example 1 with 10 parts of the soybean emulsion A and 27 parts of the soybean protein material B. The content of the oil or fat of the cheese-like food product was 30%, the content of protein thereof was 2.1% (a protein derived from the soybean emulsion A of 0.6% and a protein derived from the soybean protein material B of 1.5%), the pH thereof was 5.4, and the hardness thereof at 5° C. based on a rheometer measurement value was 650 g/19.6 mm² (measured with a circular plunger having a diameter of 5 mm at a table speed of 50 mm/minute manufactured by Rheotech Corporation).

Example 3

A vegetable cheese-like food product was obtained in the similar manner as in Example 1 by replacing 12 parts of the soybean emulsion A and 25 parts of the soybean protein material B of Example 1 with 15 parts of the soybean emulsion A and 22 parts of the soybean protein material B. The content of the oil or fat of the cheese-like food product was 30%, the content of protein thereof was 2.0% (a protein derived from the soybean emulsion A of 0.8% and a protein derived from the soybean protein material B of 1.2%), the pH thereof was 5.4, and the hardness thereof at 5° C. based on a rheometer measurement value was 600 g/19.6 mm² (measured with a circular plunger having a diameter of 5 mm at a table speed of 50 mm/minute manufactured by Rheotech Corporation).

Example 4

A vegetable cheese-like food product was obtained in the similar manner as in Example 1 by replacing 12 parts of the soybean emulsion A and 25 parts of the soybean protein material B of Example 1 with 21 parts of the soybean emulsion A and 16 parts of the soybean protein material B. The content of the oil or fat of the cheese-like food product was 30%, the content of protein thereof was 2.1% (a protein derived from the soybean emulsion A of 1.2% and a protein derived from the soybean protein material B of 0.9%), the pH thereof was 5.4, and the hardness thereof at 5° C. based on a rheometer measurement value was 550 g/19.6 mm² (measured with a circular plunger having a diameter of 5 mm at a table speed of 50 mm/minute manufactured by Rheotech Corporation).

Comparative Example 4

A vegetable cheese-like food product was obtained in the similar manner as in Example 1 by replacing 12 parts of the soybean emulsion A and 25 parts of the soybean protein material B of Example 1 with 6 parts of the soybean emulsion A and 31 parts of the soybean protein material B. The content of the oil or fat of the cheese-like food product was 30%, the content of protein thereof was 2.0% (a protein derived from the soybean emulsion A of 0.3% and a protein derived from the soybean protein material B of 1.7%), the pH thereof was 5.4, and the hardness thereof at 5° C. based on a rheometer measurement value was 580 g/19.6 mm² (measured with a circular plunger having a diameter of 5 mm at a table speed of 50 mm/minute manufactured by Rheotech Corporation).

Comparative Example 5

A vegetable cheese-like food product was obtained in the similar manner as in Example 1 by replacing 12 parts of the soybean emulsion A and 25 parts of the soybean protein material B of Example 1 with 27 parts of the soybean emulsion A and 10 parts of the soybean protein material B. The content of the oil or fat of the cheese-like food product was 30%, the content of protein thereof was 2.0% (a protein derived from the soybean emulsion A of 1.5% and a protein derived from the soybean protein material B of 0.5%), the pH thereof was 5.4, and the hardness thereof at 5° C. based on a rheometer measurement value was 400 g/19.6 mm$^2$ (measured with a circular plunger having a diameter of 5 mm at a table speed of 50 mm/minute manufactured by Rheotech Corporation).

Table 3 shows the evaluation results of Examples 2 to 4 and Comparative examples 4 and 5.

TABLE 3

|  | Example 2 | Example 3 | Example 4 | Comparative example 4 | Comparative example 5 |
|---|---|---|---|---|---|
| Soybean emulsion A* | 10 | 15 | 21 | 6 | 27 |
| Soybean protein material B** | 27 | 22 | 16 | 31 | 10 |
| Protein derived from A* | 0.6 | 0.8 | 1.2 | 0.3 | 1.5 |
| Protein derived from B** | 1.5 | 1.2 | 0.9 | 1.7 | 0.5 |
| Content of proteins | 2.1 | 2.0 | 2.1 | 2.0 | 2.0 |
| Shredding property | Yes | Yes | Yes | Yes | No |
| Meltiness/ Heat melting | Yes | Yes | Yes | Yes | Yes |
| Oil release | Yes to some extent | Yes | Yes | No | Yes |
| Burn | No | No | No | Yes | No |
| Spreadability after heat melting | Yes | Yes | Yes | Yes | Yes |
| Soy milk flavor | ◯ | ◯ | ◯ | △ | △ |
| Milky flavor | ◎ | ◎ | ◯ | △ | △ |
| Rich taste | ◯ | ◎ | ◎ | △ | ◯ |

Soybean emulsion A*: "Ko-cream"
Soybean protein material B**: "Bimi-Tonyu"

As shown in Table 3, the food products of Examples 2 to 4 containing 0.6 to 1.2% of the protein derived from the soybean emulsion A and 0.9 to 1.5% of the protein derived from the soybean protein material B had suitability for a shaping process such as shredding, exhibited the heat melting property and natural cheese-like oil-release when it was heated at 200° C. for 5 minutes, and had a moderate soymilk flavor and milky flavor. Meanwhile, although the food product of Comparative example 4 containing 0.3% of the protein derived from the soybean emulsion A and 1.7% of the protein derived from the soybean protein material B had suitability for a shaping process such as shredding and exhibited the heat melting property when it was heated at 200° C. for 5 minutes, the occurrence of slight burn was recognized with no natural cheese-like oil-release. In addition, although the food product of Comparative example 5 containing 1.5% of the protein derived from the soybean emulsion A and 0.5% of the protein derived from the soybean protein material B had slightly weak suitability for a shaping process such as shredding and exhibited the heat melting property and natural cheese-like oil-release when it was heated at 200° C. for 5 minutes, it had a slightly strong soymilk flavor and poor milky flavor.

Example 5

A vegetable cheese-like food product was prepared in the similar manner as in Example 1 by replacing 25 parts of the palm mid fraction oil of Example 1 with 25 parts of the refined hardened coconut oil (an SFC of 89.8% at 10° C. and 60.2% at 20° C., a rising melting point of 32.5° C.). The vegetable cheese-like food product had a pH of 5.4 and a hardness at 5° C. based on a rheometer measurement value was 650 g/19.6 mm$^2$ (measured with a circular plunger having a diameter of 5 mm at a table speed of 50 mm/minute manufactured by Rheotech Corporation).

Comparative Example 6

A vegetable cheese-like food product was prepared in the similar manner as in Example 1 by replacing 25 parts of the palm mid fraction oil of Example 1 with 25 parts of milk fat (an SFC of 46.8% at 10° C. and 17.2% at 20° C., a rising melting point of 31° C.). The vegetable cheese-like food product had a pH of 5.4 and a hardness at 5° C. based on a rheometer measurement value was 300 g/19.6 mm$^2$ (measured with a circular plunger having a diameter of 5 mm at a table speed of 50 mm/minute manufactured by Rheotech Corporation).

Comparative Example 7

A vegetable cheese-like food product was prepared in the similar manner as in Example 1 by replacing 18 parts of the acid-treated starch derived from peas of Example 1 with 18 parts of hydroxypropylated phosphoric acid cross-linked starch derived from rice. The vegetable cheese-like food product had a pH of 5.4 and a hardness at 5° C. based on a rheometer measurement value was 250 g/19.6 mm$^2$ (measured with a circular plunger having a diameter of 5 mm at a table speed of 50 mm/minute manufactured by Rheotech Corporation).

TABLE 4

|  | Example 5 | Comparative example 6 | Comparative example 7 |
|---|---|---|---|
| Melting point fraction in palm oil | — | — | 25 |
| Refined hardened coconut oil | 25 | — | — |
| Milk fat | — | 25 | — |
| Acid-treated starch | 17 | 17 | — |
| Phosphoric acid cross-linked starch | — | — | 17 |
| Shredding property | Yes | No | No |
| Meltiness/ Heat melting | Yes | Yes | No |
| Oil release | Yes | Yes | No |
| Burn | No | No | Yes |
| Spreadability after heat melting | Yes | Yes | No |
| Soy milk flavor | ◯ | ◯ | ◯ |
| Milky flavor | ◎ | ◎ | ◎ |
| Rich taste | ◎ | ◎ | ◎ |

As shown in Table 4, the food product of Example 5 in which the refined hardened coconut oil (an SFC of 89.8% at 10° C. and 60.2% at 20° C.) was used in place of palm mid fraction had the shredding property, meltiness, a soymilk flavor, and a milky flavor similarly to that of Example 1. Meanwhile, the food product of Comparative example 6 in which the milk fat (an SFC of 46.8% at 10° C. and 17.2% at 20° C.) was used in place of palm mid fraction had good meltiness, a soymilk flavor, and a milky flavor, but had a poor shredding property. The food product of Comparative example 7 in which the phosphoric acid cross-linked starch was used in place of an acid-treated starch had a good soymilk flavor and milky flavor, but had a poor shredding property and no meltiness.

INDUSTRIAL APPLICABILITY

According to the present invention, a method for producing a vegetable cheese-like food product which exhibits suitability for a shaping process, such as shredding, and which has natural cheese-like meltiness (melting and oil-release when heated) and a natural cheese-like milky flavor can be provided.

What is claimed is:

1. A method for producing a vegetable cheese-like food product, comprising:
    adjusting a pH of an emulsified oil or fat composition, which comprises 0.6 to 1.4 wt. % of protein derived from a soybean emulsified composition A, 0.6 to 1.5 wt. % of protein derived from a soybean protein material B described below, an acid-treated starch, and an oil or fat in which a solid fat content (SFC) accounts for at least 45% at 10° C. and at least 20% at 20° C., to pH 3.5 to 5.7 using an organic acid fermentation and/or a lactic acid fermentation,
    the soybean emulsified composition A: a soybean emulsified composition having a protein content per dry matter of 25 wt. % or more, a lipid content, which refers to a content as a chloroform-methanol mixed solvent extract, of 100 wt. % or more with respect to the protein content, and an LCI value, which refers to a content of lipophilic proteins included in soybean protein, of 55% or more; and
    the soybean protein material B: a soybean protein material having a content of lipophilic proteins included in all proteins of 40% or less as an LCI value and a lipid content, which refers to a content as a chloroform-methanol mixed solvent extract, with respect to a protein content of less than 10 wt. %.

2. The method for producing a vegetable cheese-like food product according to claim 1, wherein a total amount of the protein derived from the soybean emulsified composition A and the protein derived from the soybean protein material B is 1 to 3 wt. %, and a content ratio between the protein derived from the soybean emulsified composition A and the protein derived from the soybean protein material B is 0.2 to 2.

3. The method for producing a vegetable cheese-like food product according to claim 1, wherein a rising melting point of an oil or fat is 20 to 50° C., and a content of the oil or fat is 10 to 50 wt. %.

4. The method for producing a vegetable cheese-like food product according to claim 3, wherein a hardness at 5° C. based on a rheometer measurement value is 500 g to 2000 g/19.6 mm², which is measured with a circular plunger having a diameter of 5 mm at a table speed of 50 mm/minute.

5. A method for continuously producing the vegetable cheese-like food product according to claim 1, comprising:
    mixing a raw material containing the soybean proteins described in claim 1, an oil or fat, an acid-treated starch, and water;
    adjusting a pH to pH 3.5 to 5.7 through organic acid fermentation and/or lactic acid fermentation, and then homogenizing; and
    after the homogenizing, performing a heat treatment using at least one device selected from a tube heat exchanger, a high speed shear cooker, and a direct steam blow type sterilizer, and cooling.

6. The method for producing a vegetable cheese-like food product according to claim 2, wherein a rising melting point of an oil or fat is 20 to 50° C., and a content of the oil or fat is 10 to 50 wt. %.

7. The method for producing a vegetable cheese-like food product according to claim 6, wherein a hardness at 5° C. based on a rheometer measurement value is 500 g to 2000 g/19.6 mm², which is measured with a circular plunger having a diameter of 5 mm at a table speed of 50 mm/minute.

8. A method for continuously producing the vegetable cheese-like food product according to claim 2, comprising:
    mixing a raw material containing the soybean proteins described in claim 1, an oil or fat, an acid-treated starch, and water;
    adjusting a pH to pH 3.5 to 5.7 through organic acid fermentation and/or lactic acid fermentation, and then homogenizing; and
    after the homogenizing, performing a heat treatment using at least one device selected from a tube heat exchanger, a high speed shear cooker, and a direct steam blow type sterilizer, and cooling.

9. A method for continuously producing the vegetable cheese-like food product according to claim 3, comprising:
    mixing a raw material containing the soybean proteins described in claim 1, an oil or fat, an acid-treated starch, and water;
    adjusting a pH to pH 3.5 to 5.7 through organic acid fermentation and/or lactic acid fermentation, and then homogenizing; and
    after the homogenizing, performing a heat treatment using at least one device selected from a tube heat exchanger, a high speed shear cooker, and a direct steam blow type sterilizer, and cooling.

10. A method for continuously producing the vegetable cheese-like food product according to claim 4, comprising:
    mixing a raw material containing the soybean proteins described in claim 1, an oil or fat, an acid-treated starch, and water;
    adjusting a pH to pH 3.5 to 5.7 through organic acid fermentation and/or lactic acid fermentation, and then homogenizing; and
    after the homogenizing, performing a heat treatment using at least one device selected from a tube heat exchanger, a high speed shear cooker, and a direct steam blow type sterilizer, and cooling.

11. A method for continuously producing the vegetable cheese-like food product according to claim 6, comprising:
    mixing a raw material containing the soybean proteins described in claim 1, an oil or fat, an acid-treated starch, and water;
    adjusting a pH to pH 3.5 to 5.7 through organic acid fermentation and/or lactic acid fermentation, and then homogenizing; and after the homogenizing, performing a heat treatment using at least one device selected from a tube heat exchanger, a high speed shear cooker, and a direct steam blow type sterilizer, and cooling.

12. A method for continuously producing the vegetable cheese-like food product according to claim 7, comprising:

mixing a raw material containing the soybean proteins described in claim 1, an oil or fat, an acid-treated starch, and water;

adjusting a pH to pH 3.5 to 5.7 through organic acid fermentation and/or lactic acid fermentation, and then homogenizing; and after the homogenizing, performing a heat treatment using at least one device selected from a tube heat exchanger, a high speed shear cooker, and a direct steam blow type sterilizer, and cooling.

\* \* \* \* \*